(12) United States Patent
Ajgaonkar

(10) Patent No.: US 11,778,167 B1
(45) Date of Patent: Oct. 3, 2023

(54) METHOD AND SYSTEM FOR PREPROCESSING OPTIMIZATION OF STREAMING VIDEO DATA

(71) Applicant: Insight Direct USA, Inc., Tempe, AZ (US)

(72) Inventor: Amol Ajgaonkar, Chandler, AZ (US)

(73) Assignee: Insight Direct USA, Inc., Chandler, AZ (US)

( * ) Notice: Subject to any disclaimer, the term of this patent is extended or adjusted under 35 U.S.C. 154(b) by 0 days.

(21) Appl. No.: 17/873,789

(22) Filed: Jul. 26, 2022

(51) Int. Cl.
  *H04N 17/00* (2006.01)
  *G11B 27/031* (2006.01)

(52) U.S. Cl.
  CPC ........... *H04N 17/00* (2013.01); *G11B 27/031* (2013.01)

(58) Field of Classification Search
  CPC ...... H04N 17/002; H04N 17/02; H04N 17/04; H04N 17/00; G11B 27/031
  USPC ........................................ 348/180, 181, 187
  See application file for complete search history.

(56) References Cited

U.S. PATENT DOCUMENTS

| | | | |
|---|---|---|---|
| 5,857,109 | A | 1/1999 | Taylor |
| 6,757,434 | B2 | 6/2004 | Miled et al. |
| 7,334,249 | B1 | 2/2008 | Byers |
| 8,031,956 | B2 | 10/2011 | Ali |
| 8,229,587 | B2 | 7/2012 | Shieh et al. |
| 8,358,319 | B2 | 1/2013 | Côté et al. |
| 8,493,482 | B2 | 7/2013 | Côté et al. |

(Continued)

FOREIGN PATENT DOCUMENTS

| | | |
|---|---|---|
| AU | 499889 B2 | 5/1979 |
| AU | 2001296636 A1 | 4/2002 |

(Continued)

*Primary Examiner* — Sherrie Hsia
(74) *Attorney, Agent, or Firm* — Kinney & Lange, P.A.

(57) ABSTRACT

A method of improving a main output of a main AI model processing first video data includes analyzing incoming video data via a first processing pipeline and analyzing incoming video data via a second processing pipeline. The second processing pipeline includes receiving the incoming video data from the camera; identifying, by a parameter optimization module, first test preprocessing parameters; preprocessing the incoming video data according to the first test preprocessing parameters defined within a test runtime configuration file, wherein the first test preprocessing includes formatting the incoming video data to create first test video data; accessing the first test video data by a test AI model; processing the first test video data by the test AI model to determine a first test output that is indicative of a first test inference dependent upon the first test video data; and comparing the first test output and the main output to a baseline criterion. In response to the first test output satisfying the baseline criterion, the parameter optimization module can alter the first preprocessing parameters in the first runtime configuration file to be similar to the first test preprocessing parameters in the test runtime configuration file and, in response to the first test output failing to satisfy the baseline criterion, replace the first test preprocessing parameters with second test preprocessing parameters that are different from the first test preprocessing parameters and repeat the steps of analyzing the incoming video data via the second preprocessing pipeline.

20 Claims, 6 Drawing Sheets

(56) References Cited

U.S. PATENT DOCUMENTS

| | | |
|---|---|---|
| 8,539,355 B2 | 9/2013 | Compagnat et al. |
| 8,577,279 B2 | 11/2013 | Baker et al. |
| 8,593,483 B2 | 11/2013 | Côté et al. |
| 8,786,625 B2 | 7/2014 | Côté et al. |
| 9,741,098 B2 | 8/2017 | Cox |
| 9,871,998 B1 | 1/2018 | Curlander et al. |
| 10,114,980 B2 | 10/2018 | Barinov et al. |
| 10,122,906 B2 | 11/2018 | Yang et al. |
| 10,176,309 B2 | 1/2019 | Tormasov et al. |
| 10,380,431 B2 | 8/2019 | Winter et al. |
| 10,424,087 B2 | 9/2019 | Risser |
| 10,497,136 B2 | 12/2019 | Tamaazousti et al. |
| 10,529,106 B2 | 1/2020 | Eckert |
| 10,674,185 B2 | 6/2020 | Thomas et al. |
| 10,687,022 B2 | 6/2020 | Rasheed et al. |
| 10,701,321 B2 | 6/2020 | Westmacott et al. |
| 10,756,912 B2 | 8/2020 | Balasaygun et al. |
| 10,776,941 B2 | 9/2020 | Hollander et al. |
| 10,922,105 B1 | 2/2021 | Verma et al. |
| 10,958,854 B2 | 3/2021 | Elboher |
| 10,972,519 B2 | 4/2021 | Bar-Mashiah et al. |
| 10,979,663 B2 | 4/2021 | Amengual Galdon et al. |
| 10,979,718 B2 | 4/2021 | Chou et al. |
| 11,038,884 B2 | 6/2021 | Li |
| 11,044,525 B2 | 6/2021 | Armaly |
| 11,050,551 B2 | 6/2021 | Maggu et al. |
| 11,075,744 B2 | 7/2021 | Tormasov et al. |
| 11,120,013 B2 | 9/2021 | Bates et al. |
| 11,138,345 B2 | 10/2021 | Zou et al. |
| 11,153,069 B2 | 10/2021 | Kurian |
| 11,196,978 B2 | 12/2021 | Presler |
| 11,509,836 B1 * | 11/2022 | Ajgaonkar ............ G06V 30/10 |
| 2009/0033745 A1 | 2/2009 | Yeredor et al. |
| 2013/0038737 A1 | 2/2013 | Yehezkel et al. |
| 2016/0127749 A1 | 5/2016 | Chowdhury et al. |
| 2016/0205341 A1 | 7/2016 | Hollander et al. |
| 2017/0085892 A1 | 3/2017 | Liu et al. |
| 2017/0134162 A1 | 5/2017 | Code et al. |
| 2018/0342045 A1 | 11/2018 | Lutz et al. |
| 2020/0336710 A1 | 10/2020 | Zhang |
| 2020/0380261 A1 | 12/2020 | Chandran et al. |
| 2021/0124760 A1 | 4/2021 | Klein et al. |
| 2021/0165966 A1 | 6/2021 | Swamypillai et al. |
| 2021/0195268 A1 | 6/2021 | Jiang et al. |
| 2021/0227126 A1 | 7/2021 | Se et al. |
| 2021/0233204 A1 | 7/2021 | Alattar et al. |
| 2021/0314396 A1 | 10/2021 | Basu et al. |
| 2021/0321064 A1 | 10/2021 | Broaddus |
| 2021/0337217 A1 | 10/2021 | Reddiar et al. |

FOREIGN PATENT DOCUMENTS

| | | |
|---|---|---|
| CA | 2260932 A1 | 2/1998 |
| CA | 3057924 A1 | 4/2021 |
| CN | 105430429 B | 9/2019 |
| DE | 2945615 A1 | 5/1981 |
| EP | 0824824 A1 | 2/1998 |
| EP | 2200000 B1 | 1/2011 |
| EP | 3374926 A1 | 9/2018 |
| EP | 3275175 A4 | 11/2018 |
| EP | 3559868 A1 | 10/2019 |
| EP | 3719687 A1 | 10/2020 |
| EP | 3644277 A4 | 3/2021 |
| GB | 201406814 | 5/2014 |
| WO | 2001011862 A9 | 2/2001 |
| WO | 2004061729 A2 | 7/2004 |
| WO | 2016078490 A1 | 5/2016 |
| WO | 2020022956 A1 | 1/2020 |
| WO | 2021053604 A1 | 3/2021 |
| WO | 2021135641 A1 | 7/2021 |
| WO | 2021208952 A1 | 10/2021 |
| WO | 2021226601 A1 | 11/2021 |

* cited by examiner

METHOD AND SYSTEM FOR PREPROCESSING OPTIMIZATION OF STREAMING VIDEO DATA

BACKGROUND

This disclosure relates generally to the optimization of preprocessing of streaming video data and, more specifically, to the optimization of preprocessing parameters to improve a main output of a main artificial intelligence model.

Cameras are beneficial for use in many areas of commercial and personal practice. For example, security cameras are used within (and outside) commercial warehouses and on private personal property. Other applications use cameras along assembly lines for quality control purposes. With the increased capabilities of cameras having higher quality imagery (i.e., resolution) and a wider field of view, more area can be shown in the streaming video by the camera. A large portion of the frame/field of view may be of little or no interest to the consumer (e.g., a security or manufacturing company). However, current practices relay the entirety of the streaming video (i.e., the entire frame/field of view) to the consumer, which can be time and resource consuming due to the need to transfer large frame (i.e., field of view), high resolution video data.

SUMMARY

A system and method for selection/extraction, preprocessing, and publishing of video data of a region of interest (i.e., a scene) that is a subset of a field of view of streaming video is disclosed herein. The system and method can also include processing the video data by a consumer/subscriber after the video data has been published.

Streaming video data is received from a camera with a first field of view. The video data is then preprocessed, by a computer processor such as a gateway or digital container, according to preprocessing parameters defined within a runtime configuration file that is pushed down to the computer processor. The runtime configuration file can be stored and/or edited distant from the computer processor, and any edits/revisions to the runtime configuration file can be pushed to and applied by the computer processor to the streaming video data in real time to alter the preprocessing applied to the video data. The preprocessing can include formatting/cropping the streaming video data received from the camera so as to be first video data of a first region of interest (i.e., a scene) having a second field of view that is less than (shows less area than) the first field of view shown by the entirety of the streaming video data from the camera. The preprocessing as defined by the preprocessing parameters in the runtime configuration file can also include altering the first video data's grayscale, contrast, brightness, color threshold, size, blur, hue saturation value (HSV), sharpen, erosion, dilation, Laplacian image processing, Sobel image processing, pyramid up, and pyramid down (among others). The first video data can then be published to an endpoint (such as a topic on an asynchronous messaging library like ZeroMQ) for subscription and use by a first subscriber/consumer.

The first video data can then be viewed, used, and/or processed by the first subscriber. The preprocessing as defined in the runtime configuration file can be tailored to the subscriber and the needs/uses of the subscriber and the processing to be performed by the subscriber. For example, the processing performed by the subscriber after publishing of the first video data may be using an artificial intelligence (AI) model to analyze scenarios occurring on/in the first video data. The AI model may require the first video data to be in a particular size, format, etc., which can be selected and applied during the preprocessing as set out in the runtime configuration file so that the subscriber does not need to perform this preprocessing before applying the AI model. The processing, by a computer processor, of the first video data by the subscriber can be performed distant from the camera, the location at which the runtime configuration file is stored and/or edited, and the gateway/container upon which the preprocessing is performed. The first subscriber can perform the processing of the video data to determine at least one output, with the output being indicative of an inference dependent on the first video data. For example, the first video data can be processed by an AI model to determine the amount of a particular product that has passed by on an assembly line (i.e., the amount of the product being an inference dependent on the first video data). The processing can include other operations, such as applying optical character recognition, clipping the first video data to make a video having a specific duration, and/or capturing one frame from the first video data to create a static image of a specific moment of the first video data.

The preprocessing and processing system can include additional features, such as a testing system designed to optimize the preprocessing parameters in the configuration file to improve the analysis (e.g., increase identification of inferences, increase accuracy, and/or decrease latency) of an AI model used by a subscriber during the processing stage. The testing system includes a test processing pipeline (as opposed to the main processing pipeline) that receives streaming video data from the camera and alters the preprocessing parameters in a test configuration file used to preprocess the streaming video data to create test video data. The test video data is then published to a test unified endpoint for access and processing by a test AI model. The test AI model determines a test output indicative of a test inference dependent upon the preprocessed test video data. A parameter optimization module analyzes the test output (and potentially the main outputs from the main processing pipeline) and compares the outputs to a baseline criterion. The baseline criterion to which the test output is compared can be a value representative of correctly identified inferences, a value representative of accuracy, and/or a value representative of latency. Those values can be set to be values dependent upon the main output determined by the main AI model such that the baseline criterion is the values of the main output. Alternatively, the baseline criterion can be set at other values as determined by a user or by the parameter optimization module. If the test output satisfies the baseline criterion (e.g., is greater than the baseline criterion), parameter optimization module can alter the main preprocessing parameters in the main configuration file in the main processing pipeline to be similar to the preprocessing parameters in the test configuration file. The newly altered preprocessing parameters (in the newly altered main configuration file) are then applied/performed on the incoming video data by the gateway to create video data that is then processed by main IA model to determine main outputs, with the main outputs being similar to the test outputs. If the test output does not satisfy the baseline criterion (e.g., is less than the baseline criterion), parameter optimization module alters the test preprocessing parameters in the test configuration file and the testing pipeline loop is repeated until the test output satisfies the baseline criterion.

Parameter optimization module can alter any video edits of the test preprocessing parameters defined within the test configuration file. The alterations can be a change in which video edits to apply/perform, an order in which the video edits are to be performed, and/or the values of the video edits. The alteration of the test video edits can be determined through various methods, including trial and error, fuzzy logic, or other methods. The starting values/configuration of the test video edits of the test preprocessing parameters (i.e., the first iteration of preprocessing parameters in the test configuration file) can be determined by a user, from a look-up table, dependent upon previous starting values, or from other methods.

One embodiment of a method of improving a main output of a main AI model processing first video data includes analyzing incoming video data via a first processing pipeline and analyzing incoming video data via a second processing pipeline. The first processing pipeline includes receiving incoming video data from a camera; preprocessing the incoming video data according to first preprocessing parameters defined within a first runtime configuration file, wherein the preprocessing includes formatting the incoming video data to create the first video data; accessing the first video data by the main AI model; and processing the first video data by the main AI model to determine the main output that is indicative of a first inference dependent upon the first video data. The second processing pipeline includes receiving the incoming video data from the camera; identifying, by a parameter optimization module, first test preprocessing parameters; preprocessing the incoming video data according to the first test preprocessing parameters defined within a test runtime configuration file, wherein the first test preprocessing includes formatting the incoming video data to create first test video data; accessing the first test video data by a test AI model; processing the first test video data by the test AI model to determine a first test output that is indicative of a first test inference dependent upon the first test video data; and comparing the first test output and the main output to a baseline criterion. In response to the first test output satisfying the baseline criterion, the parameter optimization module can alter the first preprocessing parameters in the first runtime configuration file to be similar to the first test preprocessing parameters in the test runtime configuration file and, in response to the first test output failing to satisfy the baseline criterion, replace the first test preprocessing parameters with second test preprocessing parameters that are different from the first test preprocessing parameters and repeat the steps of analyzing the incoming video data via the second preprocessing pipeline.

Another embodiment includes a system for improving a main output of a main AI model analyzing video data. The system includes a camera configured to collect incoming video data, a first processing pipeline for analyzing incoming video data, and a second processing pipeline for analyzing the incoming video data. The first processing pipeline includes a first runtime configuration file that includes first preprocessing parameters for formatting the incoming video data; a first gateway that is configured to receive the incoming video data from the camera and preprocess the incoming video data according to the first preprocessing parameters defined within the first runtime configuration file, wherein the preprocessing of the incoming video data by the first gateway creates first video data; a first endpoint to which the first video data is published to allow access by the main AI model; and the main AI model configured to access the first video data and process the first video data to determine a main output that is indicative of a first inference dependent upon the first video data. The second processing pipeline includes a first test runtime configuration file that includes first test preprocessing parameters for formatting the incoming video data; a parameter optimization module that is configured to receive the incoming video data from the camera and preprocess the incoming video data according to the first test preprocessing parameters defined within the first test runtime configuration file, wherein the test preprocessing includes formatting the incoming video data to create first test video data; a test endpoint to which the first test video data is published to allow access by a test AI model; and the test AI model configured to access the first test video data and process the first test video data to determine a test output that is indicative of a test inference. The parameter optimization module is configured to access the main output, the test output, and the first runtime configuration file. Additionally, the parameter optimization module is configured to compare the main output and the test output to a baseline criterion and, in response to the test output satisfying the baseline criterion, alter the first preprocessing parameters in the first runtime configuration file to be similar to the first test preprocessing parameters in the test runtime configuration file. Finally, the parameter optimization module is configured to, in response to the test output failing to satisfy the baseline criterion, replace the first test preprocessing parameters with second test preprocessing parameters that are different from the first test preprocessing parameters and repeating the preprocessing of the incoming video data to create second test video data and the processing of the second test video data by the test AI model.

Figure 1:
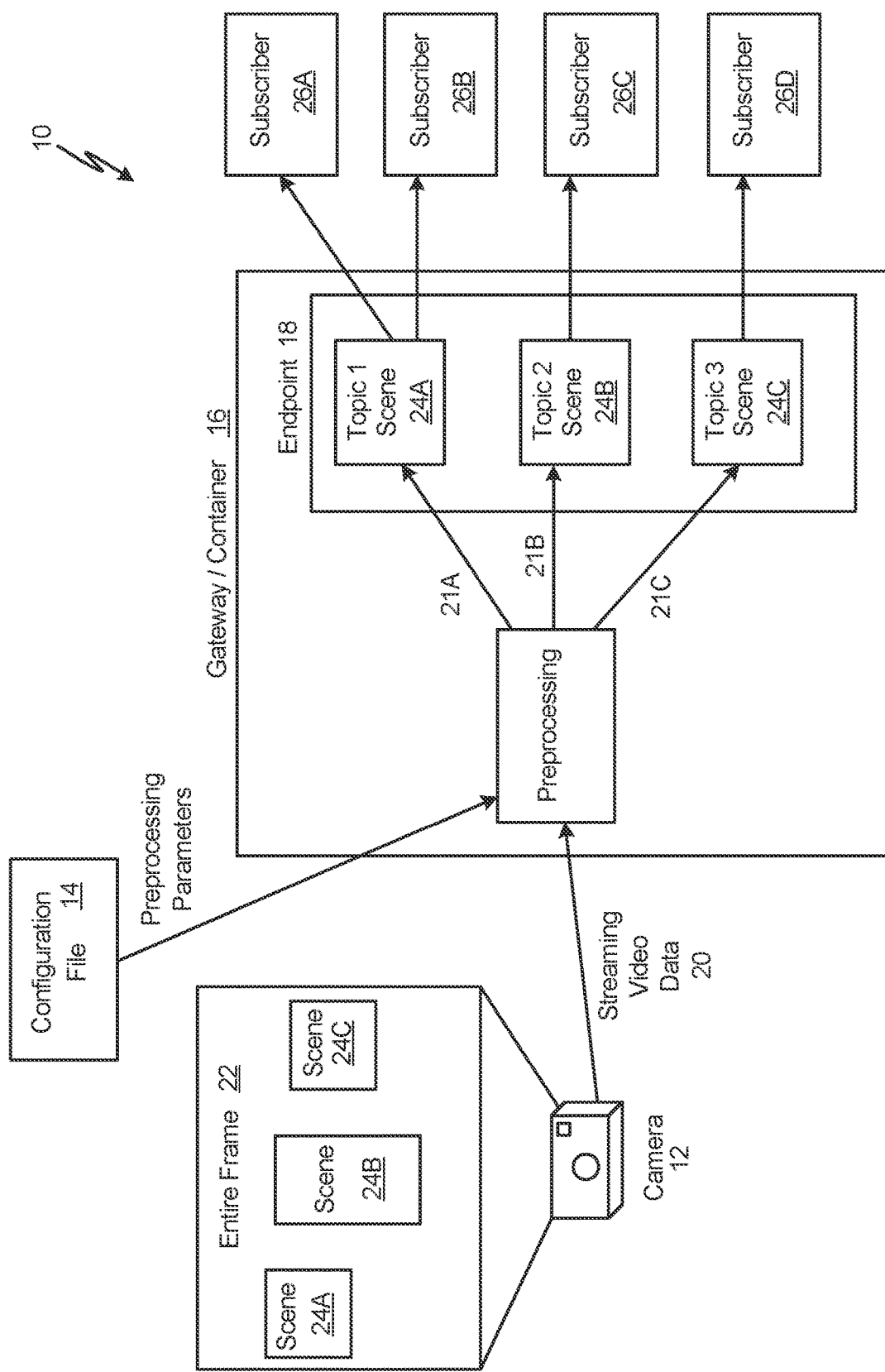
FIG. 1 is a schematic of the scene selection and preprocessing system.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

FIG. 1 is a schematic of system 10 for selection/extraction, preprocessing, and publishing to subscribers of video data of a region of interest (i.e., a scene) that is a subset of a first field of view of the streaming video. System 10 can include camera 12, configuration file 14, gateway/container 16, and publishing location/endpoint 18. Camera 12 can include streaming video data 20 having entire frame 22 with a first field of view. Scenes 24A, 24B, and 24C (i.e., individual regions of interest) can be selected/extracted from entire frame 22 each having a second field of view, a third field of view, and a fourth field of view, respectively, that are less than the first field of view of entire frame 22. Camera 12 collects streaming video data 20 and transfers/sends streaming video data 20 to gateway/container 16. Gateway/container 16 preprocesses streaming video data 20 according to preprocessing parameters defined in configuration file 14 and publishes (i.e., allows access/makes available) the preprocessed video data as first video data 21A (for scene 24A), second video data 21B (for scene 24B), and third video data 21C (for scene 24C) to publishing location/endpoint 18. Subscribers 26A-26D can subscribe to video data 21A-21A of each scene 24A-24C located at endpoint 18 to access each scene 24A-24C.

System 10 can include machine-readable storage media. In some examples, a machine-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage media can be entirely or in part a temporary memory, meaning that a primary purpose storage media is not long-term storage. Storage media, in some examples, is described as volatile memory, meaning that the memory, does not maintain stored contents when power to system 10 (or the component(s) where storage media are located) is turned off. Examples of volatile memories can include random access memories (RAM), dynamic random-access memories (DRAM), static random-access memories (SRAM), and other forms of volatile memories. In some examples, storage media can also include one or more machine-readable storage media. Storage media can be configured to store larger amounts of information than volatile memory. Storage media can further be configured for long-term storage of information. In some examples, storage media include non-volatile storage elements. Examples of such non-volatile storage elements can include magnetic hard discs, optical discs, flash memories and other forms of solid-state memory, or forms of electrically programmable memories (EPROM) or electrically erasable and programmable (EEPROM) memories. Most generally, storage media is machine-readable data storage capable of housing stored data from a stored data archive.

System 10 can also include one or multiple computer/data processors. In general, the computer/data processors can include any or more than one of a processor, a microprocessor, a controller, a digital signal processor (DSP), an application specific integrated circuit (ASIC), a field-programmable gate array (FPGA), or other equivalent discrete or integrated logic circuitry. System 10 can include other components not expressly disclosed herein but that are suitable for performing the functions of system 10 and associated methods of preprocessing and processing video data and other forms of data. For example, system 10 can include communication software and/or hardware for pushing/sending configuration file 14 from storage media at a location distant from gateway/container 16, such as cloud storage, to gateway/container 16 for execution/implementation on streaming video data 20.

Camera 12 can be any device capable of collecting streaming video data 20, such as a Real Time Streaming Protocol (RTSP) camera or a USB camera. Streaming video data 20 can be video data that is continuously captured/recorded by camera 12 in any suitable format. Camera 12 can be positioned/located to provide streaming video data 20 displaying entire frame 22 with a first field of view. The first field of view shown/displayed by camera 12 can be a wide field of view that shows multiple regions of interest. Video data 20 being collected, for example, can show a wide field of view of a warehouse for storing commercial products and/or an assembly line producing commercial products of which each individual subscriber 26A-26D may only be interested in a region/scene 24A-24C that is a subset of entire frame 22. Camera 12 can collect and transfer streaming video data 20 in any resolution/video quality and any format, including (but not limited to) MP4, AVI, FLV, WMV, MOV, MPEG, Motion JPEG, AVCHD, WebM, and/or MKV. Camera 12 can transfer/send streaming video data 20 to gateway/container 16 over any suitable means, including via the internet, short-range wireless technology, or any other type of wired and/or wireless connection.

Configuration file 14 is an editable file that contains preprocessing parameters that define, among other instructions, how streaming video data 20 is to be preprocessed by gateway/container 16 to create video data 21A-21C. Configuration file 14 can include numerous other instructions for gateway/container 16, including which camera 12 to connect to (i.e., receive streaming video data 20 from), what portion of entire frame 22 to select/extract to create scenes 24A-24C (i.e., how to crop frame 22 to create scenes 24A-24C), and at which endpoint 18 to publish the preprocessed scenes 24A-24C. This is discussed in detail with regards to FIG. 2. Configuration file 14 can be edited/revised and pushed/conveyed to gateway/container 16 for execution in real time (i.e., runtime) such that an editor can revise the preprocessing parameters and those revisions can be applied to scenes 24A-24C at runtime. Configuration file 14 can be an executable program file or have another format for including instructions and conveying information that is then used by gateway/container 16 to apply the preprocessing to video streaming data 20. Additionally, configuration file 14 can be stored in storage media adjacent to and/or part of gateway/container 16 or in storage media distant from gateway/container 16, such as in the cloud. Configuration file 14 can be accessible only by one editor or can be accessible by multiple parties (e.g., editors), which may include subscribers 26A-26D who can edit the preprocessing parameters defined by/within configuration file 14 to instruct gateway/container 16 to preprocess one or each of scenes 24A-24C depending on the needs/desires of subscribers 26A-26D, respectively.

Gateway/container 16 can include a computer processor capable of performing instructions provided by configuration file 14, which can include preprocessing parameters that are to be applied to streaming video data 20. Gateway/container 16 can be a gateway node, edge device, container, virtual machine, or other software and/or hardware able to accept configuration file 14 and perform the instructions therein to apply the preprocessing parameters to streaming video data 20. Further, gateway/container 16 can be within a single computer hardware set up due to virtualization. Gateway/container 16 can include one or multiple storage media for storing information, such as the preprocessing parameters pushed/sent to gateway/container 16 by/from configuration file 14 and/or other information like streaming video data 20. Gateway/container 16 can be located at various locations, including adjacent to camera 12 and/or on the same network as camera 12, distant from camera 12 with streaming video data 20 being received by gateway/container 16 from camera 12 via a wired or wireless connection, in the cloud, or at multiple locations. Gateway/container 16 is in communication with configuration file 14 to accept instructions for applying preprocessing parameters. Additionally, gateway/container 16 may be configured to contact configuration file 14 to determine if configuration file 14 has been edited. If edited, gateway/container 16 can perform preprocessing (on streaming video data 20 being received) according to the newly edited configuration file 14. In other examples, gateway/container 16 can utilize preprocessing parameters or other information included within configuration file 14 on a period basis, and can utilize changes (or edits) made to configuration file 14 when encountered in a next iteration of the period.

For clarity, streaming video data 20 is unaltered video data that is received by gateway/container 16 from camera 12, whereas first video data 21A is video data that has been preprocessed by gateway/container 16 (according to preprocessing parameters defined in configuration file 14) to create scene 24A. Similarly, second video data 21B is video data that has been preprocessed to create scene 24B, and third video data 21C is video data that has been preprocessed to create scene 24C. For each of first, second, and third video data 21A-21C, the originating video data is streaming video data 20 (which can be converted to raw video data 20A as described with regards to FIG. 3 below). Each of scenes 24A-24C can be a subset of entire frame 22 and show second, third, and fourth fields of view, respectively, that are less than the first field of view of entire frame 22. However, other scenes can have the same field of view as first field of view of entire frame 22 and instead, other editing is performed on that scene besides cropping; for example, that scene can be edited to be in grayscale whereas entire frame 22 of streaming video data 20 is in color.

Gateway/container 16 can be in communication with endpoint 18 to which gateway/container 16 publishes the preprocessed video data 21A-21C (e.g., scenes 24A-24C). The communication can be wired or wireless, such as communication via the internet. However, endpoint 18 can be at the same location as gateway/container 16 or on the same computer hardware set up and/or network. Further, endpoint 18 can be located on the internet with a unique address and/or security protocol that allows for subscription and access to scenes 24A, 24B, and 24C. Scenes 24A, 24B, and 24C can be published to endpoint 18 using an asynchronous messaging library, for example ZeroMQ, such that scenes 24A, 24B, and 24C are published as topic 1, topic 2, and topic 3, respectively. Subscribers 26A-26D can subscribe to any of topics 1-3 to receive video data 21A-21C of scenes 24A, 24B, 24C, respectively. Gateway/container 16 can publish video data 21A-21C of each of scenes 24A-24C to endpoint 18 in any format suitable for use by subscribers 26A-26D. For example, video data 21A-21C can each be published as Motion JPEG or any of the formats listed above with regards to streaming video data 20. The format that video data 21A-21C of each of scenes 24A-24C can be designated in configuration file 14 and applied to video data 21A-21C by gateway/container 16.

Each scene 24A-24C at topics 1-3, respectively, can be subscribed to by any number of subscribers 26A-26D. In the example shown in FIG. 1, scene 24A has two subscribers 26A and 26B, while scene 24B has one subscriber 26C, and scene 24C has one subscriber 26D. Video data 21A-21C of each of scenes 24A-24C can be further processed by subscriber 26A-26D, respectively, depending on the desired output/inference to be determined from video data 21A-21C. For example, first video data 21A of scene 24A can be further processed by an AI model to determine the amount of a particular product that has passed by camera 12 (in the second field of view of scene 24A) on an assembly line. This is described in detail with regards to FIG. 5.

Figure 2:
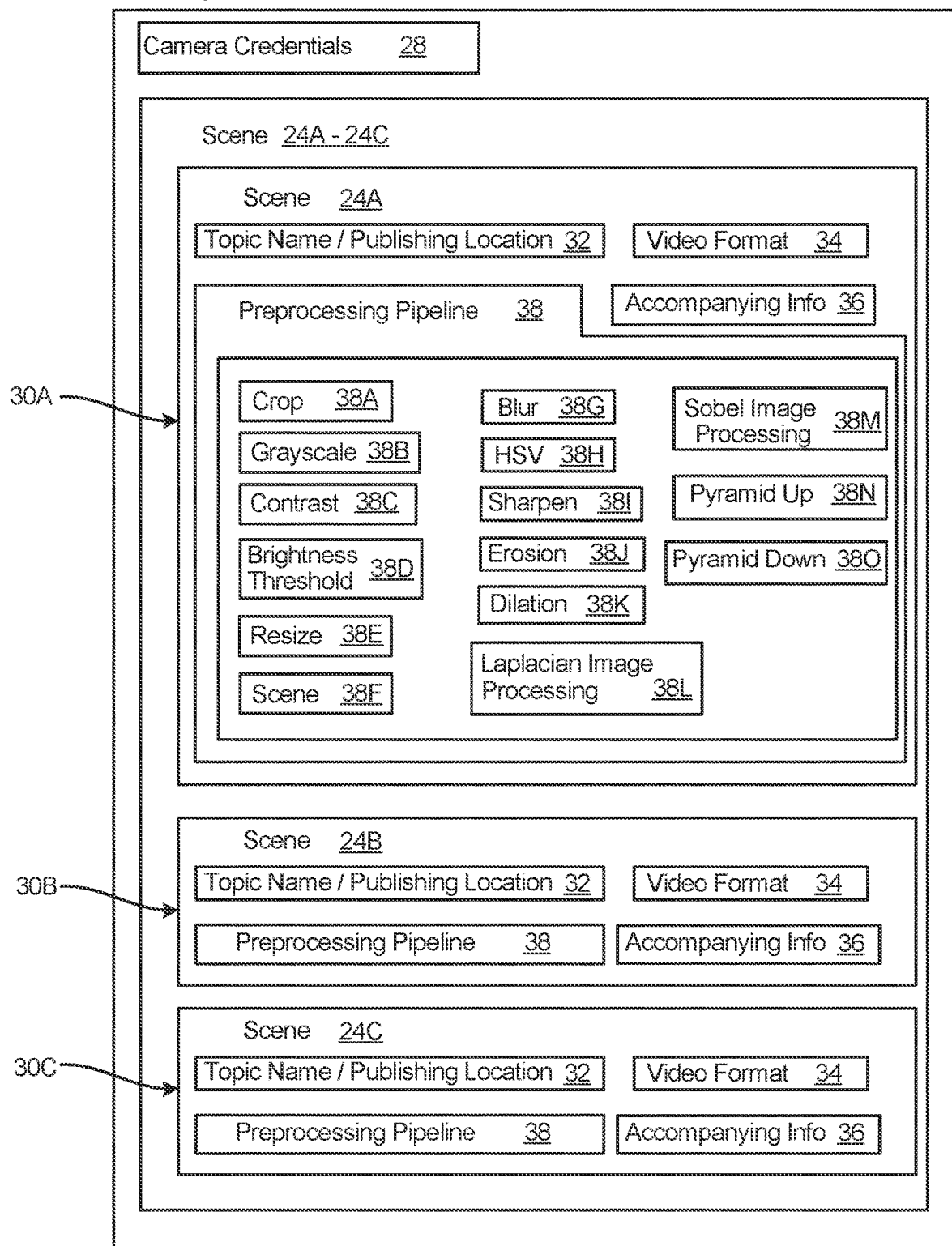
FIG. 2 is a schematic of the runtime configuration file.

FIG. 2 is a schematic of configuration file 14. Each "component" of configuration file 14 can be one or a set of instructions that, when executed by gateway/container 16, applies a process/edit. Thus, while this disclosure may discuss the components of configuration file 14 as being physical, tangible elements, the components can be one or multiple groups of executable software code contained within configuration file 14. Configuration file 14 includes information regarding camera credentials 28 and preprocessing parameters 30A-30C corresponding to scenes 24A-24C. Preprocessing parameters 30B and 30C can include the same type of information/parameters as preprocessing parameters 30A. However, for simplicity, the possibilities of information/parameters shown in FIG. 2 with regards to preprocessing parameters 30A are not shown for preprocessing parameters 30B and 30C. However, preprocessing parameters 30B and 30C can be the same or different from each other and from preprocessing parameters 30A corresponding to scene 24A. Preprocessing parameters 30A can include topic name/publishing location 32, video format 34, accompanying information 36, and preprocessing pipeline 38 having various video edits 38A-38O. Video edits 38A-38O can include the nonexclusive list of crop 38A, grayscale 38B, contrast 38C, brightness 38D, threshold 38E, resize 38F, blur 38G, hue saturation value (HSV) 38H, sharpen 38I, erosion 38J, dilation 38K, Laplacian image processing 38L, Sobel image processing 38M, pyramid up 38N, and pyramid down 38O.

Configuration file 14 can be edited and pushed/conveyed to gateway/container 16 in real time (i.e., runtime) such that preprocessing parameters 30A-30C (and the other information contained in configuration file 14) can be applied to streaming video data 20 immediately to preprocess and output video data 21A-21C. Configuration file 14 can be stored, edited, and/or pushed/conveyed to gateway/container 16 in any suitable format/file type, such as a text file, a comma separated value file, or other format/file type. Configuration file 14 can include other information/parameters not expressly disclosed herein and not shown in FIG. 2.

Configuration file 14 can include camera credentials 28, which provides the information needed for gateway/container 16 to connect to camera 12 and/or receive streaming video data 20 from camera 12. Camera credentials 28 can include other information such as encryption/decryption information, security access information, and/or instructions for beginning and/or ending the collection of streaming video data 20 by camera 12. Camera credentials 28 can include information for connecting to multiple cameras 12 and/or information for gateway/container 16 to receive the same or different streaming video data 20 from the same or different cameras 12 for different scenes 24A-24C. In one example, camera credentials 28 are provided once and applied to all scenes 24A-24C. In another example, different camera credentials 28 are provided for each scene 24A-24C and applied to each of scenes 24A-24C individually.

Configuration file 14 also includes information specific to each scene 24A-24C. The information/instructions are designated as preprocessing parameters 30A, 30B, and 30C, respectively. Preprocessing parameters 30A-30C are used by gateway/container 16 (e.g., in the form of executable instructions or indications of the executable instructions) and applied to streaming video data 20 to create video data 21A-21C of scenes 24A-24C, respectively. Preprocessing parameters 30A-30C can include topic name/publishing location 32, which designates where video data 21A-21C of scenes 24A-24C will be published after preprocessing. As described below with regards to gateway/container 16 and FIG. 3, publishing location 32 can be a proxy location which is then relayed to unified endpoint 18 to make locating the topic/scenes 24A-24C easier for subscribers 26A-26D. Publishing location 32 can be any other location suitable for providing access to subscribers 26A-26D.

Configuration file 14 can designate video format 34 that each of scenes 24A-24C is to be published at, which can be the same format as streaming video data 20 or any other type of suitable video format, including the formats listed above with regards to streaming video data 20 and/or video data 21A-21C. Scenes 24A-24C can be published having the same video format 34 or different video formats 34. If the format of the video data of scenes 24A-24C is to be changed, the steps of changing the video format can be performed before, during, or after any of the other instructions/steps set out in preprocessing parameters 30A-30C. For example, video format 34 can be changed before, during, or after video edits 38A-38O are performed by gateway/container 16.

Preprocessing parameters 30A-30C can also include accompanying information 36, which is information provided/published with video data 21A-21C for each of scenes 24A-24C. Accompanying information 36 can include any information about first video data 21 that may be of use to subscribers 26A-26C. For example, accompanying information 36 can include first video data 21A frame size, which may be helpful in indicating to subscriber 26A what processing should be performed on first video data 21A of scene 24A; if the frame size is 720 pixels by 486 lines, first video data 21A of scene 24A may be most suitable for processing by an AI model. Accompanying information 36 can include metadata and/or other information regarding what preprocessing has been performed on streaming video data 20 to create video data 21A-21C for scenes 24A-24C, respectively.

Preprocessing parameters 30A-30C can also include preprocessing pipeline 38 that includes numerous video edits 38A-38O that can be applied to streaming video data 20 to create video data 21A-21C for each of scenes 24A-24C. Preprocessing pipeline 38 can designate the instructions for the entire video edits made to streaming video data 20 for each of scenes 24A-24C. The amount of time gateway/container 16 takes to perform the video edits designated by preprocessing pipeline 38 (i.e., video edits 38A-38O) for each of scenes 24A-24C can be measured, recorded, and displayed as preprocessing performance metrics (see FIG. 4). The order in which video edits 38A-38O are performed can be optimized (or otherwise enhanced for increasing accuracy, decreasing bandwidth or latency, etc.) by gateway/container 16 and/or optimized within configuration file 14 to reduce the amount of time gateway/container 16 takes to perform preprocessing pipeline 38. This optimization can be done manually by an editor (e.g., the individual with access to edit configuration file 14) or automatically by system 10. For example, depending on which video edits 38A-38O are to be performed in preprocessing pipeline 38 by gateway/container 16, the order of performance of those video edits 38A-38O can be rearranged to reduce the amount of time gateway/container 16 takes to perform preprocessing pipeline 38. In one example, crop 38A is the first video edit 38A-38O to be performed, followed by other video edits 38B-38O.

Video edits 38A-38O are a nonexclusive list of edits that can be designated in configuration file 14 and performed on streaming video data 20 by gateway/container 16. Preprocessing pipeline 38 can include other video edits not expressly included in the list of video edits 38A-38O. Similarly, not all of video edits 38A-38O need to be performed to create video data 21A-21C of each of scenes 24A-24C, and different scenes 24A-24C can include different video edits 38A-38O performed on streaming video data 20 by gateway/container 16. In one example, only crop 38A is performed on streaming video data 20 to create first video data 21A of scene 24A, while a different crop 38A and brightness 38D, resize 38E, and dilation 38K are performed on streaming video data 20 to create second video data 21B of scene 24B that is different than first video data 21A of scene 24A.

Each of video edits 38A-38O are briefly described as follows. Crop 38A is the removal of unnecessary areas/regions (i.e., regions that are not of-interest to the subscriber) of entire frame 22 having first field of view to create scenes 24A-24C each with second, third, and fourth field of views, respectively. Scenes 24A-24C that have been cropped 38A have fields of view that are a subset of (i.e., less than) first field of view of entire frame 22. Grayscale 38B is the alteration of the color of video data 21A-21C and can include limiting the color to be between white and black. Contrast 38C is the alteration of the difference between the maximum and minimum pixel intensity. Brightness 38D is the alteration in the luminous brightness of video data 21A-21C. Threshold 38E is the alteration of the color of video data 21A-21C by changing the color of select pixels of video data 21A-21C that are above a specified threshold color value. Resize 38F is the alteration of the frame size of video data 21A-21C without cutting/cropping any of the frame out. Blur 38G is the alteration of the clarity of video data 21A-21C, which may be desired for some processing applications, such as an AI model, performed by subscribers 26A-26D. Hue saturation value (HSV) 38H is assigning a numerical readout of video data 21A-21C that corresponds to the color contained therein. Sharpen 38I is altering video data 21A-21C to make the objects therein appear more defined/sharpened. Erosion 38J is altering video data 21A-21C by shrinking pixels and/or removing pixels on object boundaries, while dilution 38K is the reverse of erosion in that video data 21A-21C is enlarged by resizing pixels and/or adding pixels at object boundaries. Laplacian image processing 38L and Sobel image processing 38M are processing techniques known in the art that can be applied to video data 21A-21C. Pyramid up 38N and pyramid down 38O are altering video data 21A-21C by smoothing and/or subsampling as known in the art. Each of scenes 24A-24C can include these and other video edits 38A-38O to be applied by gateway/container 16 to preprocess streaming video data 20 and output as scenes 24A-24C for use by subscribers 26A-26D.

Configuration file 14 can arrange the instructions of camera credentials 28 and preprocessing parameters 30A-30C to be performed in any order, or gateway/container 16 can have the capabilities to arrange/rearrange the information/instructions to be performed in a desired/optimized sequence. Additionally, gateway/container 16 can be configured to perform each set of preprocessing parameters 30A-30C in parallel such that preprocessing parameters 30A, preprocessing parameters 30B, and preprocessing parameters 30C are performed at the same time (and the time gateway/container 16 takes to perform those preprocessing parameters are measured, recorded, and displayed as metrics). Configuration file 14 can be edited at any time by an editor and then pushed/conveyed/accessed by gateway/container 16 at runtime such that the preprocessing of video data 21A-21C is altered according to the newly edited configuration file 14 at runtime.

Figure 3:
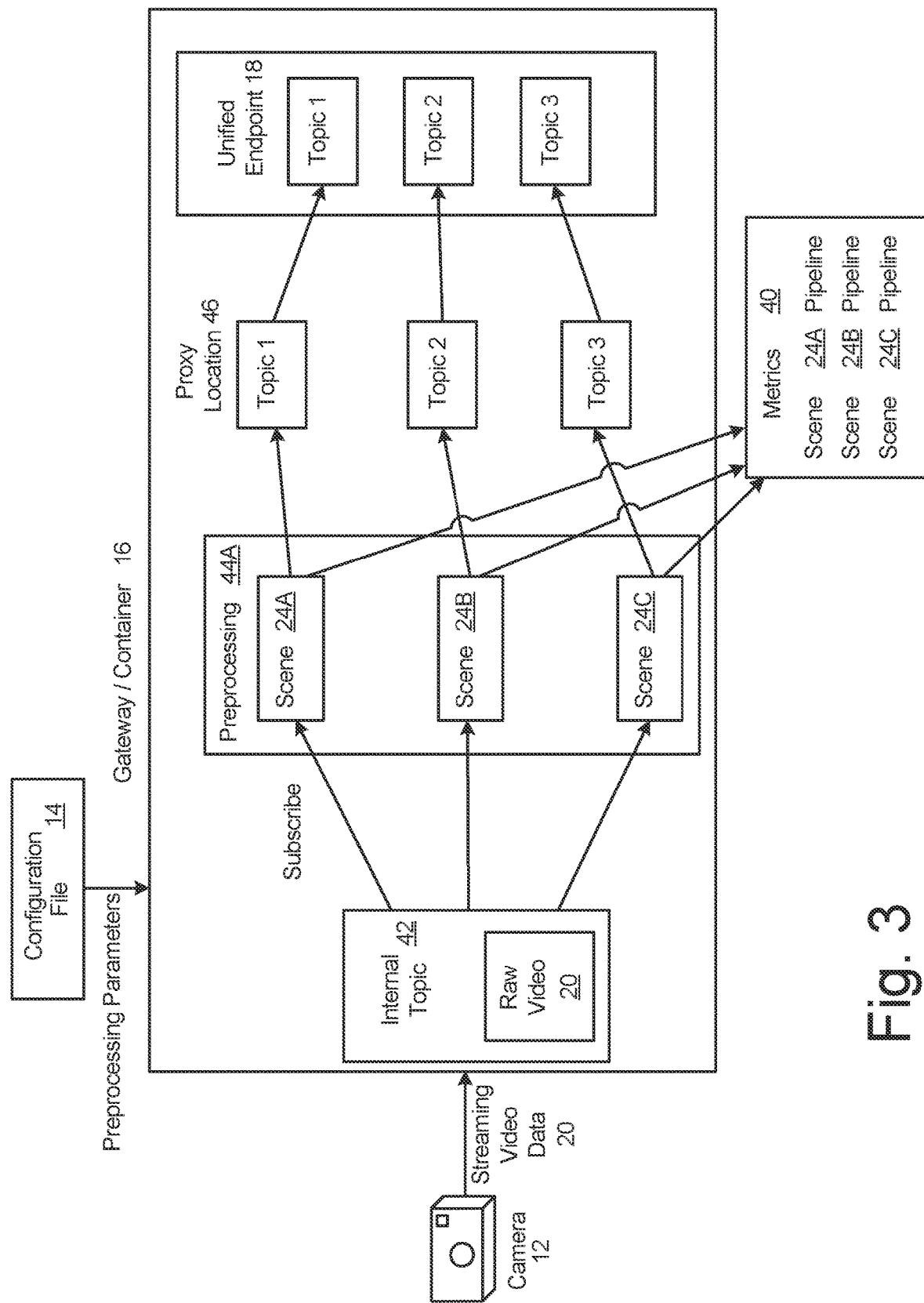
FIG. 3 is a schematic of a gateway/container along with the inputs and outputs of the gateway/container.

FIG. 3 is a schematic of gateway/container 16 (hereinafter, "gateway 16") along with inputs to and outputs from gateway 16. Each "component" of gateway 16 (and corresponding inputs and outputs) can be one or a set of instructions, programs, processors, storage media locations, and/or other software or hardware used to select/extract, preprocess, and publish video data 21A-21C as scenes 24A-24C. Thus, while this disclosure may discuss the components of gateway 16 (and corresponding inputs and output) as being physical, tangible elements, the components can be partially or entirely contained within software and/or hardware.

Inputs to gateway 16 can be streaming video data 20 (received from camera 12) and configuration file 14, which includes camera credentials 28 and preprocessing parameters 30A-30C. Outputs from gateway 16 can be scenes 24A-24C to unified endpoint 18, which is the location at which scenes 24A-24C are published as topics 1-3, and metrics 40, which is the location at which preprocessing pipeline 38 information (i.e., the amount of time gateway 16 takes to apply preprocessing parameters 30A-30C to streaming video data 20 to create scenes 24A-24C) is published/accessible. Gateway 16 can include raw video data 20A, which is streaming video data 20 that has been published at internal topic 42 and to which gateway 16 subscribes to receive video data used to create each of scenes 24A-24C. Gateway 16 can include preprocessing pipeline optimization and preprocessing 44, which uses preprocessing parameters 30A-30C as defined in configuration file 14 to preprocess streaming video data 20 (accessed as raw video data 20A at internal topic 42) to create scenes 24A-24C. Gateway 16 publishes scenes 24A-24C to proxy location 46 at topics 1-3, respectively. Gateway 16 can then publish/relay scenes 24A-24C (having video data 21A-21C) from proxy location 46 to unified endpoint 18.

Gateway 16 receives streaming video data 20 from camera 12 and can publish the video data as raw video data 20A at internal topic 42. This configuration provides for a constant, known location of published raw video data 20A independent of where the original streaming video data 20 is received from. Thus, if the location where streaming video data 20 is being received from changes (e.g., if one camera is disconnected but another camera comes online), raw video 20A will still be accessible at internal topic 42 without the need to change where gateway 16 is looking for video data to create scenes 24A-24C, thus ensuring a smooth transition of incoming streaming video data 20. Raw video data 20A published at internal topic 42 can be configured such that only gateway 16 has access.

Gateway 16 can be provided with the information in configuration file 14 (i.e., camera credentials 28 and preprocessing parameters 30A-30C) via a variety of avenues. In one example, gateway 16 has location information of configuration file 14 and actively accesses configuration file 14. In another example, configuration file 14 is pushed/conveyed to gateway 16 once, periodically, or continuously and gateway 16 passively waits to begin preprocessing streaming video data 20 until configuration file 14 has been received. Another example can be a combination of the two above examples in that gateway 16 actively accesses configuration file 14 at the beginning of preprocessing (and continues preprocessing following those known instructions) and configuration file 14 is pushed/conveyed to gateway 16 only after configuration file 14 has been edited/revised.

Gateway 16 can perform pipeline optimization on preprocessing parameters 30A-30C As discussed above, pipeline optimization can be performed by gateway 16 (or another component) to reduce the time gateway 16 takes to preprocess raw video data 20A to create video data 21A-21C (and attach any additional information) of scenes 24A-24C and/or to increase accuracy of the preprocessing operations. Pipeline optimization can include arranging/rearranging the order in which video edits 38A-38O are performed by gateway 16.

Gateway 16 can then, according to preprocessing parameters 30A-30C defined within configuration file 14, preprocess 44 raw video data 20A (which is derived from and similar to streaming video data 20) to edit raw video data 20A to create video data 21A-21C of scenes 24A-24C. The preprocessing to create each of scenes 24A-24C can be performed individually for each scene and can be performed in parallel (i.e., simultaneously). The preprocessing performed by gateway 16 can edit each of scenes 24A-24C to the desires/needs of subscribers 26A-26C, respectively. For example, gateway 16 can preprocess raw video data 20A to crop a first field of view of entire frame 22 to eliminate areas/regions of the first field of view that are of no interest to subscriber 26A and keep a second field of view of, for example, scene 24A that is a subset of the first field of view. Thus, further processing by subscriber 26A (or subscriber 26B) does not need to be performed on the areas (regions not of-interest) eliminated/trimmed by the cropping performed during preprocessing. In this example, the cropping reduces the processing time and resources needed by subscriber 26A. The alteration of video format can be included in the preprocessing and/or can be performed before, during, or after the application of other preprocessing parameters 30A-30C.

Scenes 24A-24C, which are made up of raw video data 20A that has been preprocessed according to configuration file 14 to create video data 21A-21C, are published/sent to proxy location 44. Because scenes 24A-24C are continuous video data, scenes 24A-24C are continuously published (e.g., made available) to subscribers 26A-26C, respectively. Scenes 24A-24C are published/sent first to proxy location 44 and then relayed to unified endpoint 18. Having scenes 24A-24C first being published/sent to proxy location 44 ensures that, no matter what path scenes 24A-24C take, video data 21A-21C of scenes 24A-24C will always end up at proxy location 44 and then be relayed to unified endpoint 18. Because scenes 24A-24C always end up at proxy location 44, unified endpoint 18 always knows the location to access scenes 24A-24C and can actively look to proxy location 44 to obtain scenes 24A-24C or passively wait for scenes 24A-24C to be published/sent to unified endpoint 18.

During preprocessing to create scenes 24A-24C, the amount of time gateway 16 takes to apply all of preprocessing parameters 30A-30C to raw video data 20A to create scenes 24A-24C, respectively, (or the amount of time gateway 16 takes to apply only video edits 38A-38O of preprocessing pipeline 38, depending on the desired measurement) is measured, recorded, and published at metrics 40 for viewing by an editor or any party with access. Metrics 40 can be published on an asynchronous messaging library like ZeroMQ (similar to the publishing of scenes 24A-24C) or can be displayed on a user interface similar to FIG. 4, which shows a display of scene preprocessing performance metrics 40A. Metrics 40 can be outputted from gateway 16 to numerous other systems and/or locations, including to the cloud or another location distant from gateway 16.

Figure 4:
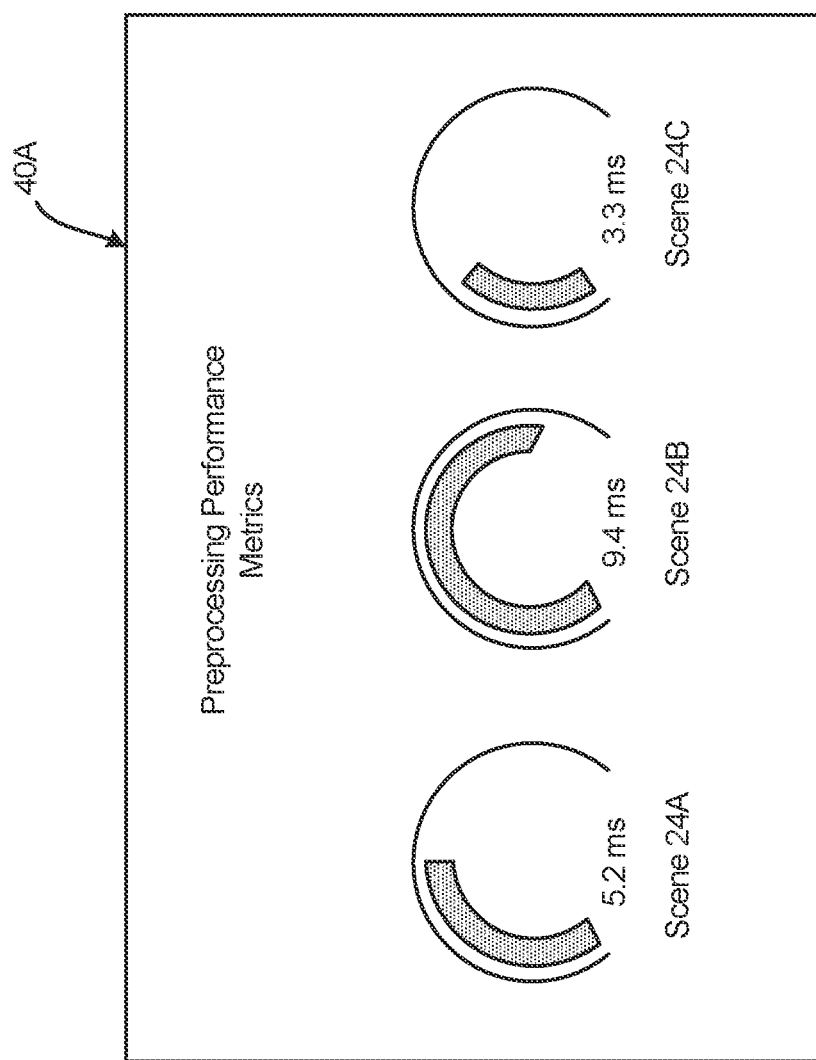
FIG. 4 is a display of the scene preprocessing performance metrics.

As shown in FIG. 4, scene preprocessing performance metrics 40A show a value of time for each of scenes 24A-24C. This value of time displayed is the amount of time gateway 16 takes to apply preprocessing parameters 30A-30C for each of scenes 24A-24C. Alternatively, this value of time displayed can be the amount of time gateway 16 takes to apply only video edits 38A-38O of preprocessing pipeline 38 and not the entirety of preprocessing parameters 30A-30C. This measurement may be desired because the other instructions/information of preprocessing parameters 30A-30C (other than video edits 38A-38O) may not change between scenes 24A-24C while preprocessing pipeline 38 (the video edits 38A-38O being applied) may be drastically different from scene to scene and thus the amount of time for performing preprocessing pipeline 38 may vary greatly from scene to scene.

For example, preprocessing performance metrics 40A in FIG. 4 show an amount of time gateway 16 takes to perform the video edits of preprocessing pipeline 38 for scene 24A as 5.2 milliseconds (ms), for scene 24B as 9.4 ms, and for scene 24C as 3.3 ms. In this example, it may be desirable or necessary to alter preprocessing parameters 30B in configuration file 14 (either remove some edit and/or rearrange the order in which those edits are performed by gateway 16) to reduce the amount of time gateway 16 takes to apply preprocessing pipeline 38 to create/alter scene 24B. As discussed above, gateway 16 can have the capability to optimize the order in which the edits/instructions in preprocessing parameters 30A-30C and/or preprocessing pipelines 38 are performed to reduce the amount of time needed to preprocess/apply the edits/instructions. Thus, preprocessing performance metrics 40A as shown in FIG. 4 may be the shortest amount of time gateway 16 takes to perform preprocessing parameters 30A-30C (or preprocessing pipeline 38, depending on the chosen measuring points).

Scenes 24A-24C can be published from proxy location 44 to unified endpoint 18 as topics 1-3 within an asynchronous messaging library, such as ZeroMQ. Unified endpoint 18 allows for a known, constant location to which subscribers 26A-26C can look to access scenes 24A-24C, respectively. If more scenes are created, those scenes would be published and accessible at unified endpoint 18, so subscribers 26A-26D and/or other subscribers would know where to look to access the additional scenes.

Figure 5:
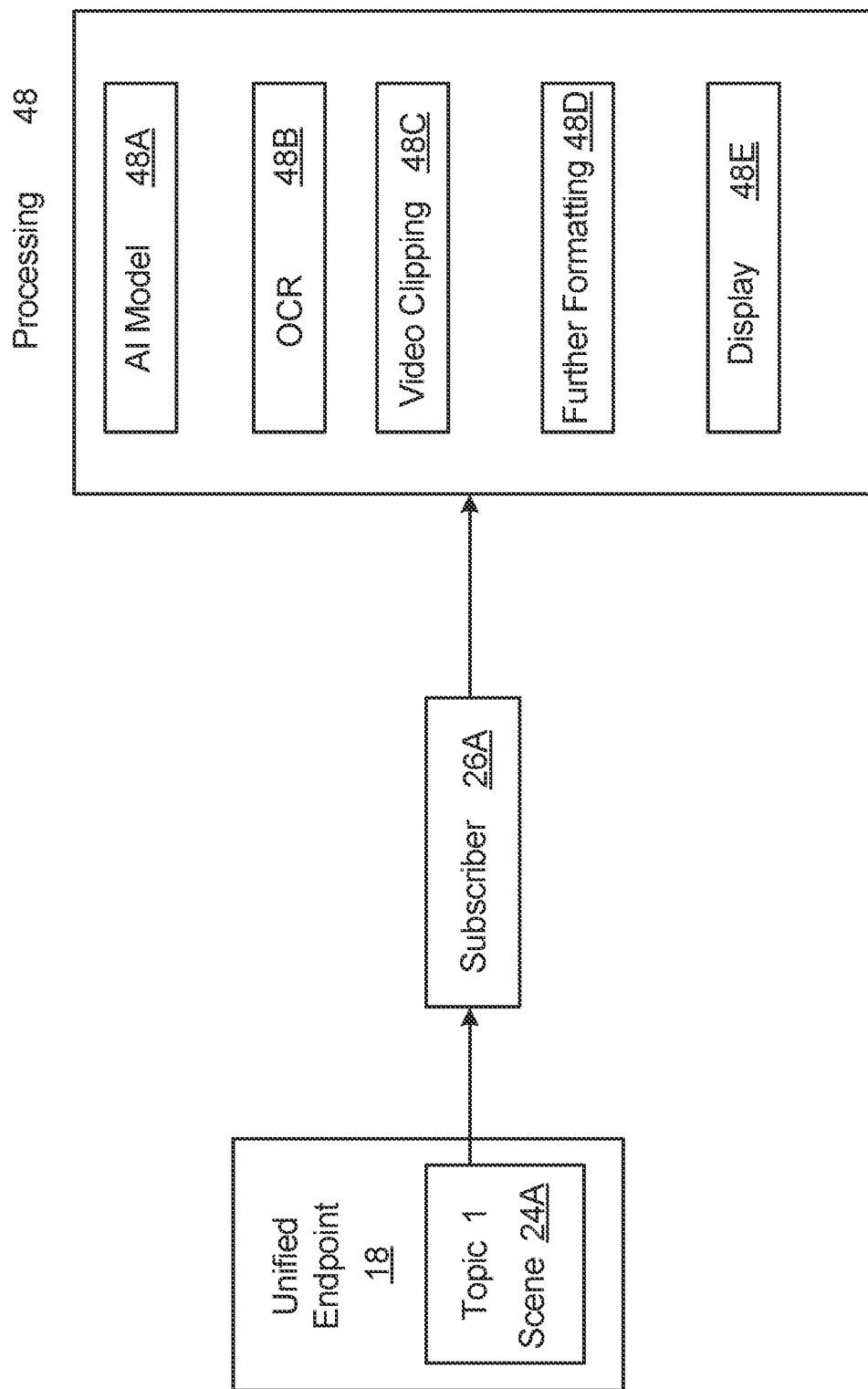
FIG. 5 is a schematic of potential processing by a first subscriber.

FIG. 5 is a schematic showing processing 48 capable of being performed on scene 24A by first subscriber 26A. Processing 48 can also be performed on scenes 24B and 24C or other scenes not disclosed herein.

After being published/sent to endpoint 18, scenes 24A-24C are available to be subscribed to and accessed by subscribers 26A-26D. Each scene can be subscribed to by any number of subscribers as is necessary/desirable. For example, a scene may be subscribed to by numerous subscribers each running processing 48 that includes different AI models. In this example, one AI model can be determining the amount of a first product that is passing through the scene on an assembly line, while a second AI model can be determining the amount of a second product that is passing through the scene on the same assembly line. In this case, the scene is unchanged between the two AI models (i.e., between the two subscribers) but the processing performed by each subscriber after the scene has been published is different. It should be noted that one entity (e.g., a person, company, quality control sector) can subscribe to a scene multiple times and thus constitute multiple subscribers. As discussed above, the preprocessing performed to create/alter each scene can be tailored to the needs of the subscriber(s) to, for example, reduce processing 48 resources and time needed to determine at least one output that is indicative of an inference the subscriber is aiming to ascertain.

The example in FIG. 5 shows first subscriber 26A performing processing 48 on scene 24A. Processing 48, as selected and executed by subscriber 26A (either automatically and/or manually by a computer processor and/or other hardware and software), can include AI model 48A, optical character recognition (OCR) 48B, video clipping 48C, further formatting 48D, and display 48E of the video data of scene 24A. Processing 48 can include other instructions/edits not expressly disclosed in FIG. 5 and listed above.

The disclosed potential instructions/edits that subscriber 26A can perform in processing 48 are as follows. AI model 48A can be a program/model that may have machine learning and can use scene 24A to determine at least one output indicative of an inference dependent upon scene 24A. The inference, for example, can be the amount of a specific product that is viewable in scene 24A over a defined period of time. AI model 48A can also be, for example, a program/model that determines how many people appear in scene 24A over a defined period of time. AI model 48A can include other capabilities and/or configurations. OCR 48B can be a program (or other configuration) that recognizes and records any characters (i.e., text) that appear in scene 24A. For example, scene 24A can be video data of a street and OCR 48B will recognize and record any text that appears on the side of a vehicle, such as a delivery truck, that is in scene 24A. Video clipping 48C can clip the video data shown in scene 24A to create a clip of a defined period of time, and/or video clipping 48C can clip the video data shown in scene 24A to create a static image of a defined moment in time. Further formatting 48D can be video edits, such as video edits 38A-38O in configuration file 14, or any other video or file formatting that are performed by subscriber 26A. For example, further formatting 48D can include cropping scene 24A to be a subset of the second field of view shown in scene 24A. Display 48E can be making scene 24A viewable on a screen or other visual display. Display 48E can also include any video formatting/reconfiguring that is necessary to effectuate the display of scene 24A. While video edits 38A-38O and further formatting 48D to create and/or process video data 21A-21C have included only edits to the video/image, edits can include editing the audio or other aspects of the video data.

The potential instructions/edits (i.e., processing 48) can be performed in parallel or series. Further, processing 48 can be configured such that instructions/edits 48A-48E work together such that one instruction/edit is prompted by an inference from another instruction/edit. For example, video clipping 48C can be configured to work in tandem with another edit/process; if AI model 48A determines that a product is defective, video clipping 48C can be prompted to record and clip a particular duration (or moment to create a static image) of scene 24A showing the defective product and save the clip (or image) for proof/validation.

System 10, with associated methods, for selection/extraction, preprocessing, and publishing of streaming video data 20 into scenes 24A-24C and for processing scenes 24A-24C is used to determine at least one output that is indicative of an inference dependent upon video data 21A-21C. System 10 reduces the preprocessing/processing time and resources necessary for accomplishing the desired output/determining the selected inference. System 10 allows for a streamlined process that extends from collecting streaming video data 20 from camera 12 to making preprocessing scenes 24A-24C available to subscribers 26A-26C for further processing and analysis/determinations. System 10 also allows for measurement, recordation, and viewing of preprocessing performance metrics 40 and optimization of preprocessing pipeline 38 (and/or preprocessing parameters 30A-30C) to reduce the amount of time and resources needed to apply preprocessing parameters 30A-30C to streaming video data 20 (i.e., raw video data 20A) to create video data 21A-21C of scenes 24A-24C.

Figure 6:
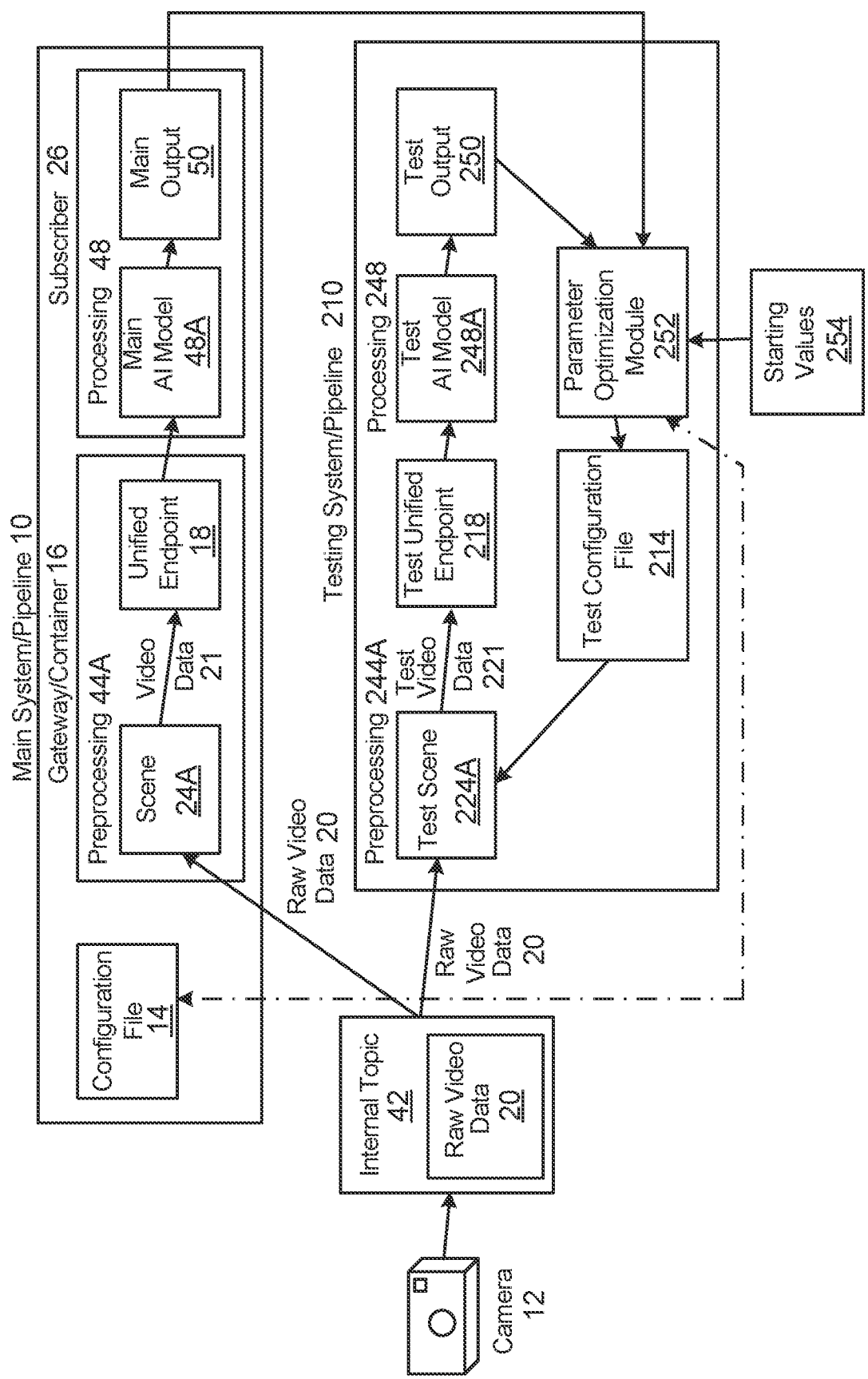
FIG. 6 is a schematic of a preprocessing and processing system including a testing system for improving an AI model.

FIG. 6 is a schematic of a preprocessing and processing system including a testing system for improving a main output of a main AI model. FIG. 6 shows main preprocessing and processing system 10 (also referred to herein as first or main system/pipeline 10) as well as testing system 210 (also referred to herein as second or testing system/pipeline 210).

Main system 10 is similar in configuration and capabilities as the system described with regards to FIGS. 1-5. As shown in FIG. 6, main system 10 includes camera 12 that collects and transmits streaming video data to internal topic 42 (which can be within gateway 16). Internal topic 42 can be a location at which the streaming video data is sent/published as raw video data 20. Raw video data 20 is then accessed by gateway 16 and preprocessed 44A to create video data 21 having scene 24A, which can be a subset of entire frame 22 as shown in FIG. 1. Once preprocessed to create video data 21, video data 21 can then be published at unified endpoint 18 for access by subscriber 26. Subscriber 26 can then process 48 video data 21 using main AI model 48A to determine main output 50 indicative of a main inference dependent upon video data 21. Similarly named and numbered components of system 10 in FIGS. 1-5 and main system 10 in FIG. 6 have the same configurations, functionalities, and capabilities. For additional information on these components, refer to the above disclosure with regards to FIGS. 1-5.

Testing system/pipeline 210 can have all the components and capabilities of system 10, and can include additional component and capabilities described herein. For example, testing system 210 can include machine-readable storage medium and/or one or multiple hardware/computer/data processors. The term "processor" as used in this disclosure can include one processor or multiple processors for performing executable instructions as described. The performance of the executable instructions can be by different processors distant from one another, by multiple processors working together, or by one processor executing all instructions. Additionally, components of similar name and/or reference number of system 10 and testing system 210 (while adding a "2" to the front of reference numbers of testing system 210) can have similar configurations and/or capabilities. For example, main AI model 48A of system 10 can be similar in configuration and capabilities to test AI model 248A of testing system 210. Similarly, configuration file 14 of system 10 can be similar in configuration, capabilities, etc. as test configuration file 214 of testing system 210.

Testing system 210 accesses raw video data 20 collected by camera 12 and potentially published at internal topic 42. Raw video data 20 is test preprocessed 244A by testing system 210 to create test video data 221 having scene 224A, which can be a subset of entire frame 22 as shown in FIG. 1 and can be the same field of view as scene 24A of video data 21. After raw video data 20 is test preprocessed 244A using test preprocessing parameters defined within test configuration file 214 to create test video data 221, test video data 221 is then published at test unified endpoint 218 for access by test AI model 248A (which can be one and the same with main AI model 48A). Test AI model 248A processes 248 test video data 221 to determine test output 250 indicative of a test inference dependent upon test video data 221. Parameter optimization module 252 can receive/access main output 50 (from main AI model 48A), test output 250 (from test AI model 248A), and/or potentially other information to determine if test output 250 satisfies the baseline criterion. If so, main configuration file 14 is altered so that preprocessing parameters of main configuration file 14 are similar to test preprocessing parameters of test configuration file 214. Then, main system/pipeline 10 preprocesses 44A the raw video data 20 to create video data 21 that is eventually analyzed/processed 48 by main AI model 48A to produce main output 50 that is improved (e.g., increased correct identification of inferences, increased accuracy, and decreased latency) as compared to the previous main output 50 before the alteration of main configuration file 14.

If test output 250 does not satisfy the baseline criterion, parameter optimization module 252 can alter the test preprocessing parameters in test configuration file 214. The new, altered test preprocessing parameters of test configuration file 214 are then reapplied to new incoming raw video data 20. New test preprocessing 244A is performed to create new test video data 221, which is then analyzed/processed by test AI model 248A to create new test output 250. Parameter optimization module 252 then compares new test output 250 to the baseline criterion. If parameter optimization module 252 determines that the new test output 250 satisfies the baseline criterion, parameter optimization module 252 can alter the main preprocessing parameters in main configuration file 14 of system 10 to be similar to the new test preprocessing parameters of the new test configuration file 214. If new test output 250 does not satisfy the baseline criterion, the test preprocessing parameters are altered and the testing loop is performed again. This testing loop can continue until the test output satisfies the baseline criterion.

To initially select the test preprocessing parameters defined within test configuration file 214 (i.e., the test preprocessing parameters that are first applied to raw video data 20 at the beginning of the testing loop), parameter optimization module 252 can use the preprocessing parameters defined in main configuration file 14 as a baseline and alter those preprocessing parameters according to starting values 254. As discussed below, starting values 254 can be selected by a user, determined from previous data, and/or be determined through other methods. The components of testing system 210 are described in greater detail below.

Testing system 210 can include machine-readable storage media and/or can include one or multiple hardware/computer/data processors. Testing system 210 can include other components not expressly disclosed herein but that are suitable for performing the functions of testing system 210 and associated methods of optimizing the preprocessing parameters to create video data 21 to improve the analysis/processing by main AI model 48A. For example, testing system 210 can include communication software and/or hardware for pushing/sending optimal preprocessing parameters to main configuration file 14 for use in system 10.

Test configuration file 214 is similar in configuration, functionality, and capabilities to configuration file 14 described with regards to FIGS. 1-5 (particularly FIG. 2). Test configuration file 214 is an editable file that contains test preprocessing parameters that define, among other instructions, how raw video data 20 is to be preprocessed 244A to create test video data 221. Configuration file 214 can include numerous other instructions. Test configuration file 214 can be editable by parameter optimization module 252 either initially (before the first preprocessing 244A) or in response to the analysis of test output 250 to better format/edit test video data 221 for processing by test AI model 248A to create improved test output 250 (as compared to previous iterations of test output 250). Test configuration file 214 contains test preprocessing parameters, which can include one or multiple test video edits (see the description with regards to FIG. 2 for more information). Parameter optimization module 252 can alter anything in test configuration file 214, including the test video edits of test preprocessing parameters. For example, parameter optimization module 252 can alter which test video edits are applied (i.e., the number and what kinds of test video edits are applied), the order in which the test video edits are applied, and the value of each of the test video edits (e.g., whether the brightness test video edit should be a value of 10 or 70).

Test configuration file 214 is applied to raw video data 20 (i.e., raw video data 20 is preprocessed 244A) to create test video data 221 having test scene 224A. Test scene 224A can have the same field of view as scene 24A of main system/pipeline 10 so that processing by main AI model 48A and by test AI model 248A can have the same baseline for analysis in creating main output 50 and test output 250, respectively.

After applying test preprocessing parameters defined within test configuration file 214 to raw video data 20 to create test video data 221, test video data 221 can be published to test unified endpoint 218. Test unified endpoint 218 can be the same in configuration, capabilities, and functionality as unified endpoint 18 of system 10, and even could be the same component so as to be one in the same with unified endpoint 18 such that video data 21 and test video data 221 are published at the same location to allow access by main AI model 48A and/or test IA model 248A. In addition to unified endpoint 218, test video data 221 can be published/sent first to a proxy location (such as proxy location 44) and then relayed to unified endpoint 218.

After being published/sent to unified endpoint 218, test video data 221 (with test scene 224A) is available to be subscribed to and accessed by test AI model 248A. Test AI model 248A processes 248 test video data 221 to determine at least one test output 250 indicative of at least one test inference dependent upon test video data 221. Test AI model 248A and main AI model 48 can be similar in configuration, capabilities, and functionality and may even be the same component. Main AI model 48A and test AI model 248A should process video data 21 and test video data 221, respectively, in a similar manner to ensure that the independent variables in determining main output and test output (i.e., the differences between main system/pipeline 10 and testing system/pipeline 21) are only the main preprocessing parameters (in configuration file 14) and the test preprocessing parameters (in test configuration file 214) as opposed to any differences in the way main AI model 48A and test AI model 248A perform the processing. Main AI model 48A and test AI model 248A can be in communication with one another so that if any changes in the processing/analysis are made to main AI model 48A, those changes are also applied to test AI model 248A.

Main AI model 48A and/or test AI model 248A can be a program/model that may have machine learning and can use the video data to determine at least one main output 50 or test output 250 indicative of an inference dependent upon the video data. The inference, for example, can be the amount of a specific product that is viewable in scene 24A or test scene 224A over a defined period of time. Main AI model 48A and/or test AI model 248A can also be, for example, a program/model that determines how many people appear in scene 24A or test scene 224A over a defined period of time. Main AI model 48A and/or test AI model 248A can include other capabilities and/or configurations.

Main output 50 and test output 250 can each include a variety of information dependent upon video data 21 and test video data 221, respectively. That information can include a value representative of a number of correctly identified inferences (e.g., a number of correctly identified products), a value representative of the accuracy of main output 50 or test output 250 (e.g., a number between 0 and 1 showing a probability that the identified inferences are correct), and/or a value representative of the latency of the processing by main AI model 48A and test AI model 248A to identify inferences (e.g., an amount of time the AI model takes to analyze the video data and identify an inference). Main output 50 can be accessed by and/or sent to subscriber 26 for further analysis, use, and/or recordation. Additionally, main output 50 and test output 250 can be accessed by and/or sent to parameter optimization module 252 for use in determining if and to what extent to alter test preprocessing parameters in test configuration file 214.

Parameter optimization module 252 can include a computer processor (e.g., computer hardware and/or executable software code) capable of receiving information regarding the baseline criterion, main output 50, test output 250, staring values 254, and other information and determining if and to what extent to alter test preprocessing parameters defined within test configuration file 214 and/or to alter the preprocessing parameters defined within configuration file 14 of main system/pipeline 10. Thus, parameter optimization module 252 can be in wired or wireless communication with any components of main system/pipeline 10 and/or testing system/pipeline 210. Parameter optimization module 252 can be similar in configuration, capabilities, and functionality as gateway 16, and can be the same component as gateway 16 such that any computing/processing/execution by parameter optimization module 214 can be performed by gateway 16. Parameter optimization module 252 can include one or multiple storage media for storing information, such as the test preprocessing parameters and/or test configuration file 214, the baseline criterion, starting values 254, main output 50, test output 250, and/or other information. Parameter optimization module 252 can be located at various locations, including within, adjacent to, or distant from gateway 16, main AI model 48A, test AI model 248A, and/or any other components of main system/pipeline 10 and testing system/pipeline 210.

Testing system/pipeline 210 can include a component similar to gateway 16 to perform all of the functions of gateway 16 with regards to main system/pipeline 10, such as preprocessing 244A raw video data 20 according to test preprocessing parameters in test configuration file 214 to create test video data 221. Alternatively, preprocessing 244A can be performed by parameter optimization module 252 such that parameter optimization module 252 can be in communication with internal topic 42 to receive/access raw video data 20 and in communication with test unified endpoint 218 to which test video data 221 is sent/published for access by test AI model 248A.

Parameter optimization module 252 receives test output 250 (and main output 50) and compares test output 250 to the baseline criterion. The comparison of test output 250 to the baseline criterion can be a comparison of any data included in test output 250 (such as values representative of correctly identified inferences, accuracy, and/or latency) to the baseline criterion.

The baseline criterion can be established/set through various methods. The baseline criterion can be a value or values designated by a user. For example, a user can select an accuracy value of 0.95 for the baseline criterion such that test output 250 must have an accuracy value at or above 0.95 to satisfy the baseline criterion. In another example, the user can select a latency value to be 10 millisecond for the baseline criterion such that test output 250 must have a latency value at or below 10 millisecond to satisfy the baseline criterion. In another example, the user can select a value of correctly identified inferences to be 12 per minute for the baseline criterion such that test output 250 must have a value of correctly identified inferences to be at or more than 12 per minute to satisfy the baseline criterion. The baseline criterion can include one or more than one of these designated values such that test output 250 must satisfy each of the designated baseline values to satisfy the baseline criterion. Additionally, the baseline criterion can be set by parameter optimization module 252 depending on a variety of factors, including the values of a previous test output 250.

Moreover, the baseline criterion can be set by the respective values of main output 50. In this situation, test output 250 is, for all intents and purposes, compared to main output 50 because main output 50 establishes the baseline criterion. For example, main output 50 can have an accuracy value of 0.90, which is then set as the baseline criterion. Thus, the baseline criterion is satisfied when a value representative of accuracy of test output 250 is greater than the value representative of the accuracy of main output 50, which is 0.90. In another example, main output 50 can have a latency value of 15 milliseconds (i.e., a time it takes main AI model 48A to process video data 21 to determine main output 50), which is then set as the baseline criterion. Thus, the baseline criterion is satisfied when a value representative of latency of test output 250 (i.e., a time it takes test AI model 248A to process test video data 221 to determine test output 25) is less than the value representative of latency of main output 50, which is 15 milliseconds. In another example, main output 50 can have a value of correctly identified inferences of 10 per minute, which is then set as the baseline criterion. Thus, the baseline criterion is satisfied when a value representative of correctly identified inferences by test AI model 248A (as set out in test output 250) is greater than the value representative of correctly identified inferences by main AI model 248A (as set out in main output 50), which is 10 per minute. The baseline criterion can include one or more than one of these values based on main output 50 such that test output 250 must satisfy each of the designated baseline values to satisfy the baseline criterion.

As mentioned above, parameter optimization module 252 compares test output 250 to the baseline criterion. If test output 50 satisfies the baseline criterion, parameter optimization module 252 can alter the preprocessing parameters in main configuration file 14 to be the same as the test preprocessing parameters in test configuration file 214 so that main output 50 will be similar to test output 250 having the improved output (after preprocessing and processing of video data by main system/pipeline 10). Thus, main output 50 is improved/optimized through the testing performed by testing system/pipeline 210. After the preprocessing parameters defined in main configuration file 14 are updated by parameter optimization module 252, testing system/pipeline 210 can continue the testing loop to find even more improved/optimal preprocessing parameters.

If test output 250 fails to satisfy the baseline criterion, parameter optimization module 252 can alter the test preprocessing parameters in test configuration file 214. Then, the testing loop is repeated by preprocessing 244A raw video data 20 according to the newly altered test preprocessing parameters in newly altered test configuration file 214, creating new test video data 221, publishing/sending new test video data 221 to test unified endpoint 218, and accessing and processing 248A by test AI model 248A to create new test output 250. Parameter optimization module 252 then compares new test output 250 to the same or a different baseline criterion. This testing loop can be repeated as many times as desired, such as until test output 250 satisfies the baseline criterion or even after test output 250 has satisfied the baseline criterion and the main preprocessing parameters have been altered to be the same as the most current test preprocessing parameters.

Similar to main preprocessing parameters of main configuration file 14, test preprocessing parameters of test configuration file 214 can include multiple test video edits (see the discussion regarding FIG. 2 and video edits 38A-38O). Parameter optimization module 252 can alter each and every test video edits of the test preprocessing parameters defined within test configuration file 214. The number of test video edits can be altered to be greater than or less than previous test video edits. For example, newly altered test preprocessing parameters can include seven test video edits, whereas the previous test preprocessing parameters only included three test video edits. Additionally, a value of each test video edit can be altered so as to be different than previous test video edits. For example, newly altered test preprocessing parameters can include a test video edit with a brightness value of 58, whereas the previous test preprocessing parameters included a test video edit with a brightness value of 14. Moreover, an order in which the test video edits are applied to raw video data 20 can be altered so as to be different than an order in which the previous test video edits were applied. For example, newly altered test preprocessing parameters can be ordered such that the crop video edit is performed before the resize video edit, whereas the previous test preprocessing parameters were ordered so that the resize video edit was performed before the crop video edit. These and other alterations can be made to test preprocessing parameters in test configuration file 214 by parameter optimization module 252 in response to information received, such as main output 50, test output 250, and other information.

Starting values 254 are the initial values of the test preprocessing parameters of test configuration file 214. Starting values 254 can be determined through various methods, including by being selected by a user and/or determined from previous data. For example, starting values 254 can be dependent upon the time of day at which testing system/pipeline 210 first begins preprocessing 244A raw video data 20. Additionally, starting values 254 can depend on starting values used for previous testing system/pipeline 210 operations. For example, if a previous operation of testing system/pipeline 210 has starting values 254 that returned optimal test output 250, similar starting values 254 may be selected for use in the current operation. Other methods not expressly disclosed herein can be used to select starting values 254.

Parameter optimization module 252 can alter the test preprocessing parameters in test configuration module 252 (either after test output 250 fails to satisfy the baseline criterion or in an attempt to further improve/optimize main output 50) through various methods, including trial and error, fuzzy logic, or other method. Using trial and error, parameter optimization module 252 can alter one aspect of the test video edits (whether each video edit is applied, the value of each video edit, and/or the order in which the video edits are performed/applied) and determine whether test output 250 is closer to or further away from satisfying the baseline criterion. The trial and error can continue until the baseline criterion is satisfied. Using fuzzy logic, parameter optimization module 252 can alter the amount of change of the test video edits and determine to what degree test output 250 is closer to or further away from satisfying the baseline criterion. Depending upon that degree, parameter optimization module 252 will increase or decrease the amount of change of the test video edits on the next iteration. Other methods of altering the test preprocessing parameters from one testing loop to the next can be used, including a combination of the two discussed above. For any of the methods of altering the test preprocessing parameters, any number of testing loops can be performed, including performing hundreds or thousands of testing loops with different test video edits of the test preprocessing parameters.

Testing system/pipeline 210 provides for a method of improving main output 50 of AI model 48A processing video data 21 by emulating main system/pipeline 10 (preprocessing 44A and processing 48 of video data 20/21) and altering the test preprocessing parameters defined within test configuration file 214 to determine test preprocessing parameters that return test output 250 that satisfies the baseline criterion. The test preprocessing parameters that return test output 250 that satisfies the baseline criterion are then applied to the main preprocessing parameters defined within main configuration file 14 of main system/pipeline 10 so that main AI model 48A returns main output 50 that are an improvement upon previous main outputs 50 (i.e., pre-altered main configuration file 14). The testing loop can continue until the preprocessing parameters are optimal and no other iterations of preprocessing parameters would return improved results of main output 50.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of improving a main output of a main AI model processing first video data, the method comprising:
analyzing incoming video data via a first processing pipeline that comprises:
receiving incoming video data from a camera;
preprocessing the incoming video data according to first preprocessing parameters defined within a first runtime configuration file, wherein the preprocessing includes formatting the incoming video data to create the first video data;
accessing the first video data by the main AI model;
processing the first video data by the main AI model to determine the main output that is indicative of a first inference dependent upon the first video data;
analyzing incoming video data via a second processing pipeline that comprises:
receiving the incoming video data from the camera;
identifying, by a parameter optimization module, first test preprocessing parameters;
preprocessing the incoming video data according to the first test preprocessing parameters defined within a test runtime configuration file, wherein the first test preprocessing includes formatting the incoming video data to create first test video data;
accessing the first test video data by a test AI model;
processing the first test video data by the test AI model to determine a first test output that is indicative of a first test inference dependent upon the first test video data;
comparing the first test output to a baseline criterion;
in response to the first test output satisfying the baseline criterion, altering the first preprocessing parameters in the first runtime configuration file to be similar to the first test preprocessing parameters in the test runtime configuration file; and
in response to the first test output failing to satisfy the baseline criterion, replacing the first test preprocessing parameters with second test preprocessing parameters that are different from the first test preprocessing parameters and repeating the steps of analyzing the incoming video data via the second preprocessing pipeline.

2. The method of claim 1, wherein the steps of preprocessing the incoming video data according to first preprocessing parameters and processing the first video data by the main AI model are both performed by a computer processor.

3. The method of claim 1, wherein the steps of preprocessing the incoming video data according to the first test preprocessing parameters and processing the first test video data by the test AI model are both performed by a computer processor.

4. The method of claim 1, wherein the steps of preprocessing the incoming video data according to first preprocessing parameters, processing the first video data by the main AI model, preprocessing the incoming video data according to the first test preprocessing parameters, processing the first test video data by the test AI model, and comparing the test output to the main output are all performed by a computer processor.

5. The method of claim 1, wherein the baseline criterion is a value representative of an accuracy of the main output.

6. The method of claim 5, wherein the baseline criterion is satisfied when a value representative of the accuracy of the first test output is greater than the value representative of the accuracy of the main output.

7. The method of claim 1, wherein the baseline criterion is a value representative of correctly identified inferences by the main AI model.

8. The method of claim 7, wherein the baseline criterion is satisfied when a value representative of correctly identified inferences by the test AI model is greater than the value representative of correctly identified inferences by the main AI model.

9. The method of claim 1, wherein the baseline criterion is a value representative of a latency of the processing of the main video data by the main AI model.

10. The method of claim 9, wherein the baseline criterion is satisfied when a value representative of a latency of the processing of the test video data by the test AI model is less than the latency of the processing of the main video data by the main AI model.

11. The method of claim 1, wherein the main AI model and the test AI model are the same AI model such that accessing the first video data, processing the first video data to determine the main output, accessing the test video data, and processing the test video data to determine the test output are performed by one AI model.

12. The method of claim 1, wherein the step of, in response to the test output failing to satisfy the baseline criterion, replacing the first test preprocessing parameters with second test preprocessing parameters that are different from the first test preprocessing parameters and repeating the steps of experimenting on the incoming video data via the second preprocessing pipeline further comprises:
   receiving the incoming video data from the camera,
   identifying, by a parameter optimization module, second test preprocessing parameters that are different from the first test preprocessing parameters;
   processing the incoming video data according to the second test preprocessing parameters defined within the test runtime configuration file, wherein the second test preprocessing include formatting the incoming video data to create second test video data;
   accessing the second test video data by the test AI model;
   processing the second test video data by the test AI model to determine a second test output that is indicative of a second test inference dependent upon the second test video data;
   comparing the second test output to the baseline criterion;
   in response to the second test output satisfying the baseline criterion, altering the first preprocessing parameters in the first runtime configuration file to be similar to the second test preprocessing parameters in the test runtime configuration file; and
   in response to the second test output failing to satisfy the baseline criterion, replacing the second test preprocessing parameters with third test preprocessing parameters that are different from the first test preprocessing parameters and the second test preprocessing parameters and repeating the steps of analyzing the incoming video data via the second preprocessing pipeline.

13. The method of claim 12, wherein the first test preprocessing parameters includes multiple first test video edits and the second test preprocessing parameters include multiple second test video edits.

14. The method of claim 13, wherein the second test preprocessing parameters are different from the first test preprocessing parameters in at least one of the following:
   a number of second test video edits of the second test preprocessing parameters is greater than a number of first test video edits of the first video edits;
   a value of at least one of the second test video edits is different from a value of at least one of the first test video edits; and
   an order in which the second test video edits are performed is different than an order in which the first test video edits are performed.

15. A system for improving a main output of a main AI model analyzing video data, the system comprising:
   a camera configured to collect incoming video data;
   a first processing pipeline for analyzing incoming video data, the first processing pipeline comprising:
      a first runtime configuration file that includes first preprocessing parameters for formatting the incoming video data;
      a first gateway that is configured to receive the incoming video data from the camera and preprocess the incoming video data according to the first preprocessing parameters defined within the first runtime configuration file, wherein the preprocessing of the incoming video data by the first gateway creates first video data;
      a first endpoint to which the first video data is published to allow access by the main AI model; and
      the main AI model configured to access the first video data and process the first video data to determine a main output that is indicative of a first inference dependent upon the first video data; and
   a second processing pipeline for analyzing the incoming video data, the second processing pipeline comprising:
      a first test runtime configuration file that includes first test preprocessing parameters for formatting the incoming video data;
      a parameter optimization module that is configured to receive the incoming video data from the camera and preprocess the incoming video data according to the first test preprocessing parameters defined within the first test runtime configuration file, wherein the test preprocessing includes formatting the incoming video data to create first test video data;
      a test endpoint to which the first test video data is published to allow access by a test AI model; and
      the test AI model configured to access the first test video data and process the first test video data to determine a test output that is indicative of a test inference,
   wherein the parameter optimization module is configured to access the main output, the test output, and the first runtime configuration file,
   wherein the parameter optimization module is configured to compare the test output to a baseline criterion and, in response to the test output satisfying the baseline criterion, alter the first preprocessing parameters in the first runtime configuration file to be similar to the first test preprocessing parameters in the test runtime configuration file,
   wherein the parameter optimization module is configured to, in response to the test output failing to satisfy the baseline criterion, replace the first test preprocessing parameters with second test preprocessing parameters that are different from the first test preprocessing parameters and repeating the preprocessing of the incoming video data to create second test video data and the processing of the second test video data by the test AI model.

16. The system of claim 15, further comprising:
   a first computer processor that at least partially includes at least one of the first gateway, the main AI model, the parameter optimization module, and the test AI model.

17. The system of claim 15, wherein the first test preprocessing parameters includes multiple first test video edits and the second test preprocessing parameters include multiple second test video edits.

18. The system of claim 17, wherein the second test preprocessing parameters are different from the first test preprocessing parameters in at least one of the following:
   a number of second test video edits of the second test preprocessing parameters is greater than a number of first test video edits of the first video edits;
   a value of at least one of the second test video edits is different from a value of at least one of the first test video edits; and
   an order in which the second test video edits are performed is different than an order in which the first test video edits are performed.

19. The system of claim 15, wherein the main AI model and the test AM model are the same, singular AI model.

20. The system of claim 15, further comprising:
an internal topic in communication with the camera, the first processing pipeline, and the second processing pipeline to which the incoming video data is published to allow access by the first processing pipeline and the second processing pipeline.

\* \* \* \* \*